United States Patent
Lobo (10) Patent No.: US 12,461,538 B2
(45) Date of Patent: Nov. 4, 2025

(54) SMALL UNMANNED AERIAL SYSTEMS DETECTION AND CLASSIFICATION USING MULTI-MODAL DEEP NEURAL NETWORKS

(71) Applicant: The United States of America, as represented by the Secretary of the Navy, Crane, IN (US)

(72) Inventor: Arthur P. Lobo, Fishers, IN (US)

(*) Notice: Subject to any disclaimer, the term of this patent is extended or adjusted under 35 U.S.C. 154(b) by 419 days.

(21) Appl. No.: 17/884,377

(22) Filed: Aug. 9, 2022

(65) Prior Publication Data
US 2023/0039196 A1 Feb. 9, 2023

Related U.S. Application Data

(60) Provisional application No. 63/230,927, filed on Aug. 9, 2021.

(51) Int. Cl.
G05D 1/00 (2024.01)
B64C 39/02 (2023.01)
G06N 5/04 (2023.01)

(52) U.S. Cl.
CPC ............ G05D 1/104 (2013.01); B64C 39/024 (2013.01); G05D 1/0022 (2013.01); G06N 5/042 (2013.01); *B64U 2201/102* (2023.01)

(58) Field of Classification Search
CPC .... G05D 1/104; G05D 1/0022; B64C 39/024; G06N 5/042; G06N 3/0442; G06N 3/045; G06N 3/0464; G06N 3/084; B64U 2201/102; G06F 18/2413; G01S 7/417
See application file for complete search history.

(56) References Cited

U.S. PATENT DOCUMENTS

| | | | |
|---|---|---|---|
| 11,108,151 B1* | 8/2021 | Santhakumar | G08B 13/19 |
| 2019/0279030 A1* | 9/2019 | Song | G06F 18/2413 |
| 2020/0382156 A1* | 12/2020 | Lo | G08G 5/0013 |
| 2022/0032932 A1* | 2/2022 | Kale | G06N 3/045 |
| 2022/0036741 A1* | 2/2022 | Ozturk | G06N 3/08 |
| 2023/0027496 A1* | 1/2023 | Rajakumar | G06N 3/08 |
| 2023/0129005 A1* | 4/2023 | Challita | B64D 45/00 |
| | | | 701/492 |

FOREIGN PATENT DOCUMENTS

CN 109067427 A * 12/2018 ............ G06N 3/0454

* cited by examiner

*Primary Examiner* — Isaac G Smith
*Assistant Examiner* — Nikki Marie M Molina
(74) *Attorney, Agent, or Firm* — Naval Surface Warfare Center, Crane Division; Patrick B. Law (57) ABSTRACT

Provided is a detection and classification system and method for small unmanned aircraft systems (sUAS). The system and method detect and classify multiple simultaneous heterogeneous RC transmitters/sUAS downlinks from the RF signature using Object Detection Deep Convolutional Neural Networks (DCNNs). The method further utilizes not only passive RF, but may also utilize Electro Optic/Infrared (EO/IR), radar and acoustic sensors as well, with a fusion of the individual sensor classifications. Detection and classification with Identification Friend or Foe (IFF) of individual sUAS in a swarm, multi-modal approach for high confidence classification, decision, and implementation on a low C-SWaP (cost, size, weight and power) NVIDIA Jetson TX2 embedded AI platform is achieved.

11 Claims, 9 Drawing Sheets

SMALL UNMANNED AERIAL SYSTEMS DETECTION AND CLASSIFICATION USING MULTI-MODAL DEEP NEURAL NETWORKS

CROSS-REFERENCE TO RELATED APPLICATIONS

The present application claims priority to U.S. Provisional Patent Application Ser. No. 63/230,927, filed Aug. 9, 2021, and entitled "SUAS DETECTION AND CLASSIFICATION USING MULTI-MODAL DEEP NEURAL NETWORKS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 2005130502) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to detection of unmanned aerial systems and, more particularly, to systems and methods for detection and classification of small unmanned aerial systems using multi-modal neural networks.

BACKGROUND

Unmanned Aircraft Systems (UAS) have become ubiquitous in recent years. There are five classes of UAS as defined by the FAA and Department of Defense. The most common class for non-military purposes is Group 1, which typically includes UASs that are less than 20 pounds in weight, and normally operate below 1200 feet above ground level and at speeds less than 250 knots. These UASs are often referred to as Small Unmanned Aircraft Systems (sUAS). The proliferation of sUASs has resulted in an urgent need for detection and classification of such aircraft systems including detection that provides, among other things, the radio control (RC) transmitter and vehicle type information to enable monitoring of these craft. Furthermore, known reactive Counter-Unmanned Aircraft Systems (C-UAS) currently perform scan and jam functions with no knowledge of the threat emitter beyond recorded frequencies. Accordingly, for C-UAS there is a need for identifying vehicle/RC transmitter type to the Electronic Warfare/Kinetic/Directed Energy weapon operator before any negation action is taken especially in urban environments with non-threat emitters.

SUMMARY

The present invention provides systems and methods for detection and classification of Small Unmanned Aircraft Systems (sUAS). The inventive systems and methods detect and classify multiple simultaneous heterogeneous RC transmitters/sUAS downlinks from the RF signature using Object Detection Deep Convolutional Neural Networks (DCNNs). The RF detection in some embodiments may be passive RF detection. In addition to passive RF detection, Electro Optic/Infrared (EO/IR), Radar and Acoustic sensors may also be utilized with a Softmax score fusion algorithm or similar method to effect the individual sensor classifications. Detection and classification may yet further include Identification Friend or Foe (IFF) of individual sUAS in a swarm, multi-modal approach for high confidence classification, decision, and implementation with a low C-SWaP (cost, size, weight and power) platform.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION

The embodiments of the present invention described herein are not intended to be exhaustive or to limit the invention to precise forms disclosed. Rather, the embodiments selected for description have been chosen to enable one skilled in the art to practice the invention.

The present disclosure provides systems and methods for detecting and classifying a sUAS based on monitored uplink and downlink radio frequency (RF) signals, radar and acoustic spectrograms based on monitored radar and acoustical/sound data, and Electro-Optic/Infrared (EO-IR) images captured using EO/IR device such as cameras, as just a few examples. Detection and classification of an sUAS may further include the determination of hostile/non-hostile intent of the sUAS, the prediction of frequency hopping (FH) sequences of FH Spread Spectrum (FHSS) RC transmitters, and specific emitter identification (SEI) can be used to differentiate between multiple sUAS of the same type.

Figure 1:
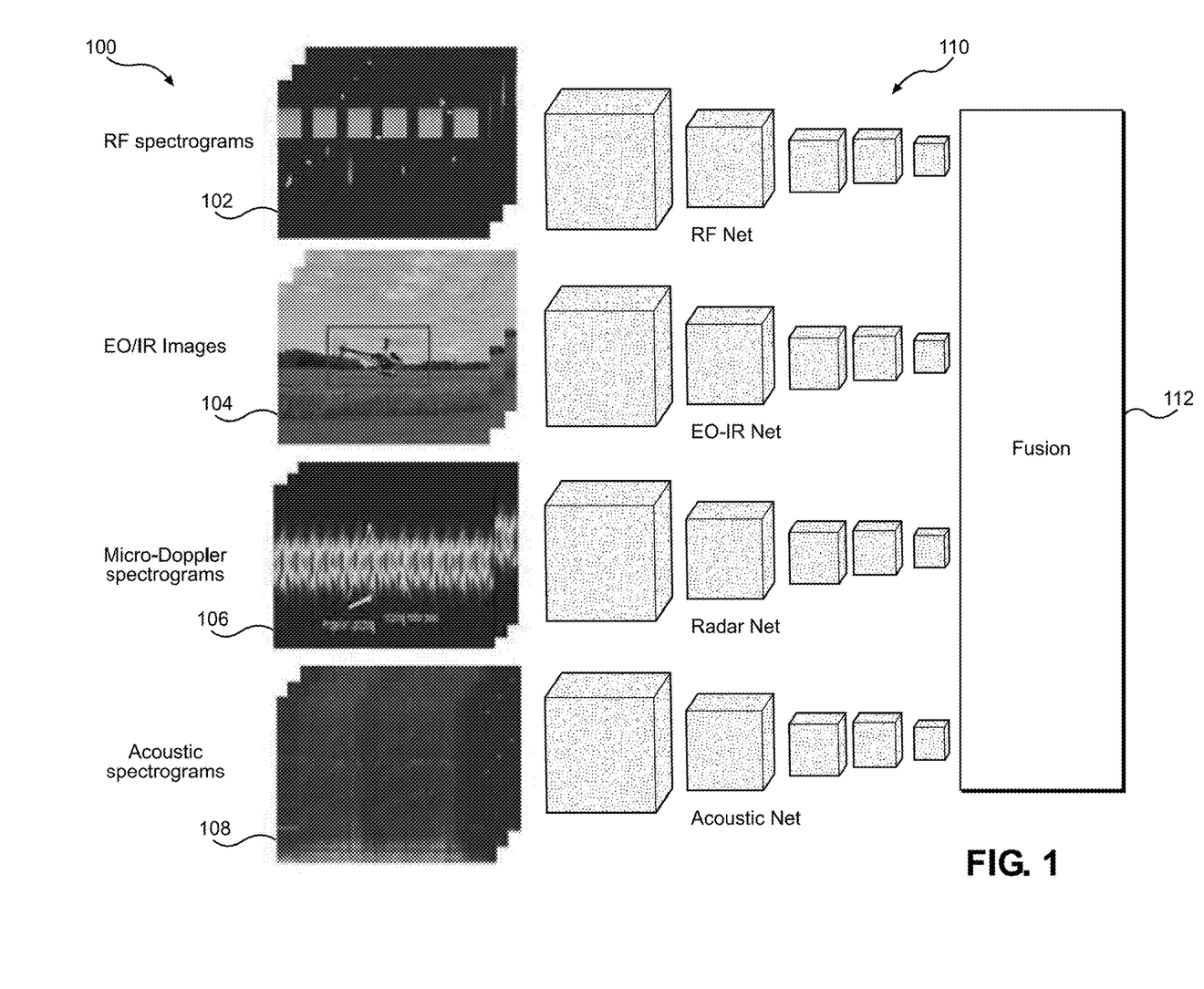
FIG. 1 shows an example of a multi-modal sUAS detection and classification system according to aspects of the present disclosure.

FIG. 1 shows an example of a multi-modal sUAS Detection and Classification system 100. It is noted here that for purposes of this application, the term "multi-modal" is defined as detection and classification using a plurality of modes such as RF detection, acoustic detection, electro-optic/infrared (EO/IR) detection, and radar detection, but the disclosure is not limited to such. The systems and methods of the present invention addresses the problem of sUAS detection, classification, and reporting on flight mission intent from signatures captured from passive RF, Radar, Acoustic and EO/IR sensors, as illustrated in FIG. 1. In particular, system 100 may include passive RF sensors (not explicitly shown in FIG. 1) that capture RF spectra and generate RF spectrograms 102. Additionally, system 100 may include electro-optic and/or infrared sensors (not explicitly shown in FIG. 1) that capture images/videos of objects such as sUASs in a vicinity of the system 100. The images/videos are shown representatively at 104.

Furthermore, the system 100 may include radar devices (not explicitly shown in FIG. 1), such as Micro-Doppler devices that collect radar data and generate radar spectrograms 106. Moreover, the system 100 may include acoustical measuring/capturing/sensing devices (not explicitly shown in FIG. 1) such as a microphone or microphone array for longer ranges to collect acoustical data. This acoustical data may be used to then generate acoustic spectrograms 108.

As further shown in FIG. 1, the spectrograms 102, 106, 108 or images/videos 104 may then be input to respective DCNN processors (to eliminate data redundancy and noise and extract progressively abstract features for classification) 110 followed by a fusion process 112, such as Softmax Score Fusion process as one example. This multi-sensor approach, even with lack or obscuration of data from one or more of the sensor modalities, will still yield a correct decision resulting in maximizing the probability of detection and minimizing the probability of false alarms. Object Detection Deep Convolutional Neural Networks (DCNNs) will be used to map from the detected signatures to sUAS classes along with hostile/non-hostile decisions. The signatures include, but are not limited to, RF spectrograms, Micro-Doppler (i.e., due to rotating rotors) and acoustic spectrograms computed from RF and Radar and Microphone sensors respectively, as well as video frames from EO/IR sensors.

Figure 2:
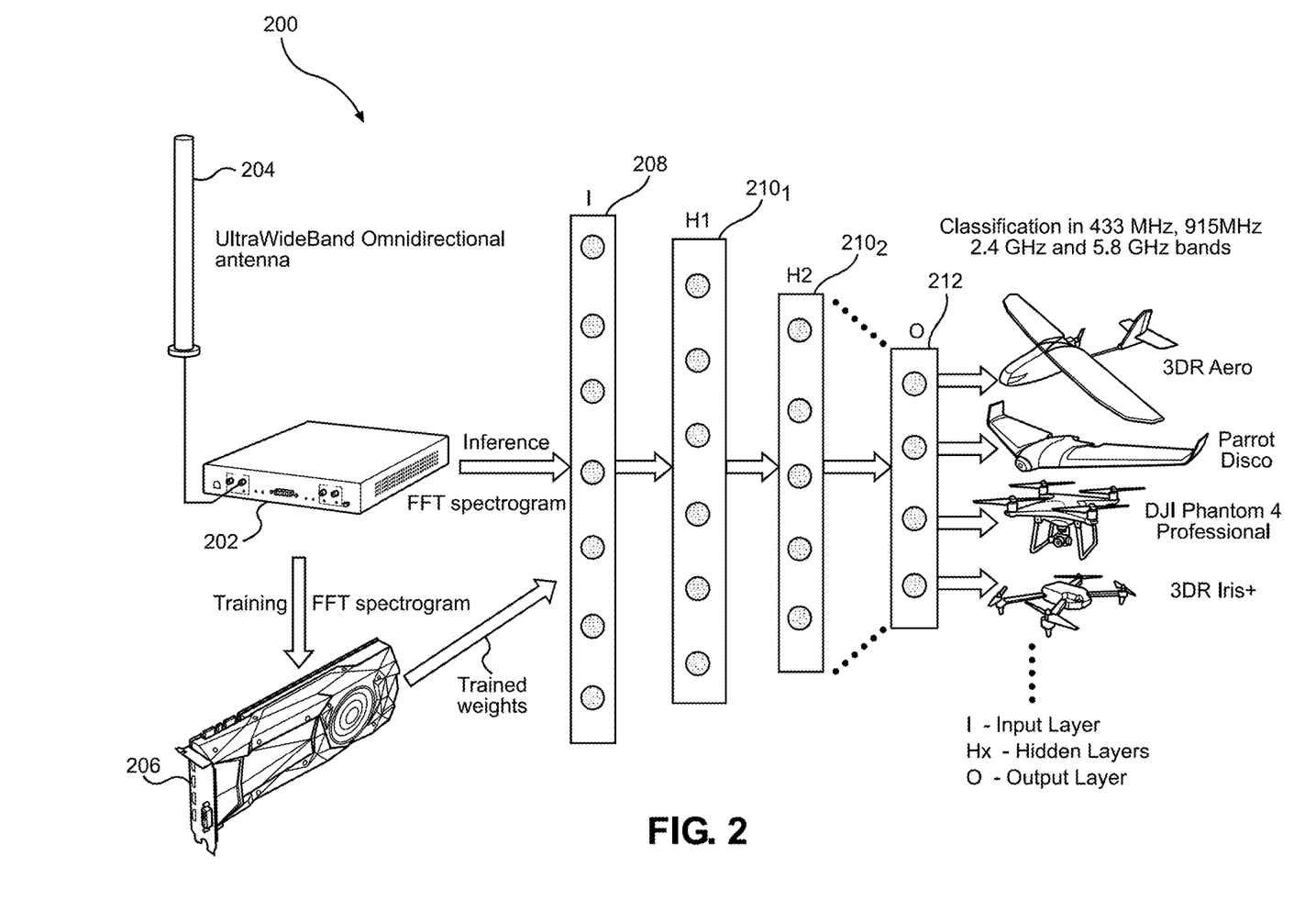
FIG. 2 shows an example of a passive RF sensor that may be used with the system of FIG. 1 according to aspects of the present disclosure.

FIG. 2 shows a specific example of a passive RF sensor system 200 that may be utilized in the system 100 shown in FIG. 1, but the disclosure is not limited to such and various other implementations may be contemplated to achieve the described functionalities. For the passive RF sensor 200 shown in FIG. 2, an RF signal may be acquired by a software defined radio (SDR) such as a USRP X300/UBX-160 SDR 202 coupled to an antenna 204, such as a MARS MA-WO-UWB 138 MHz-6 GHz ultra wideband omnidirectional antenna followed by Mini Circuits Low Noise Amplifiers for the 433 MHZ, 915 MHz, 2.4 GHz and 5.8 GHz industrial, scientific and medical (ISM) bands to detect RF signals between a radio control (RC) transceiver and SUAS controlled by the RC transceiver. In one example, the signal is sampled at a particular sample rate, such as at 100 Msps I/Q (In phase/Quadrature phase complex samples) for 1 second using a GNU Radio SDR framework on a processor such as an Ubuntu 16.04 CyberPower PC equipped with a NVIDIA GTX 1070 Graphics Processing Unit (GPU) as shown at 206. The raw I/Q samples may be sequentially windowed and processed by a Fast Fourier Transform, such as a 16,384 point FFT, to generate a high resolution spectrogram for each 1 second file for offline processing. The spectrograms may also be resized to 256×256 pixels using interpolation, such as Nearest-Neighbor interpolation method for a GoogLeNet DCNN training/testing. This resizing is shown, in part, by inputs of the FFT spectrograms from SDR 202 and trained weights from the processor 206 to input 208, which is reduced by an "x" number of hidden layers shown at 2101 and 2102, as examples. The final output 212 outputs the resultant potential sUASs that have been identified by the process. In this example, four different SUASs are shown to be identified (e.g., 3DR Aero, Parrot DISCO, DJ Phantom 4 Professional, and 3DR Iris+). Other transmitters may include DJI Phantom 2 (P2), Phantom 3 Standard (P3S), Phantom 3 Advanced (P3A), Phantom 4 Standard (P4S), Phantom 4 Professional+ (P4Pro+), Mavic Pro, Spark, Spektrum DX9, Spektrum DX7s, Devo-10 DSM2, 3DR Iris+Si4432, FrSky Taranis, FrSky DJT, Futaba FAAST14SG, Futaba S-FHSS handheld controllers and RMILEC T4070NB20, DragonLink, EzUHF, RangeLink and RFD900+ Long Range System (LRS) transmitters and Fat Shark, Lumenier TX5G6R and TS58200 FPV (First Person Video) transmitters.

In further aspects, a background class may be recorded for each of the bands (e.g., the four bands 433 MHz, 915 MHz, 2.4 GHz and 5.8 GHz). Variable signal to noise ratios (SNR) may also be simulated by attenuating the pixel values by a factor between 0.1 and 1.0. In one example, approximately 70% of the spectrograms may be used to train the DCNN and the remaining approximate 30% may be used for testing. In one example, training and testing may be accomplished using an NVIDIA DIGITS/CAFFE Deep Learning (DL) framework, which is browser driven and allows to easily change DCNN hyperparameters and visualize the accuracy and loss curves during training. In one example, using such a framework may result in classification accuracies of 100% for the 433 and 915 MHz bands, 99.8% for the 2.4 GHz band and 99.3% for the 5.8 GHz band. Similar high classification scores may be obtained on a dataset generated from limited look windows distributed over the one second waveform to simulate the scan and jam cycles of counter measure jammers (e.g., CREW jammers).

Figure 3:
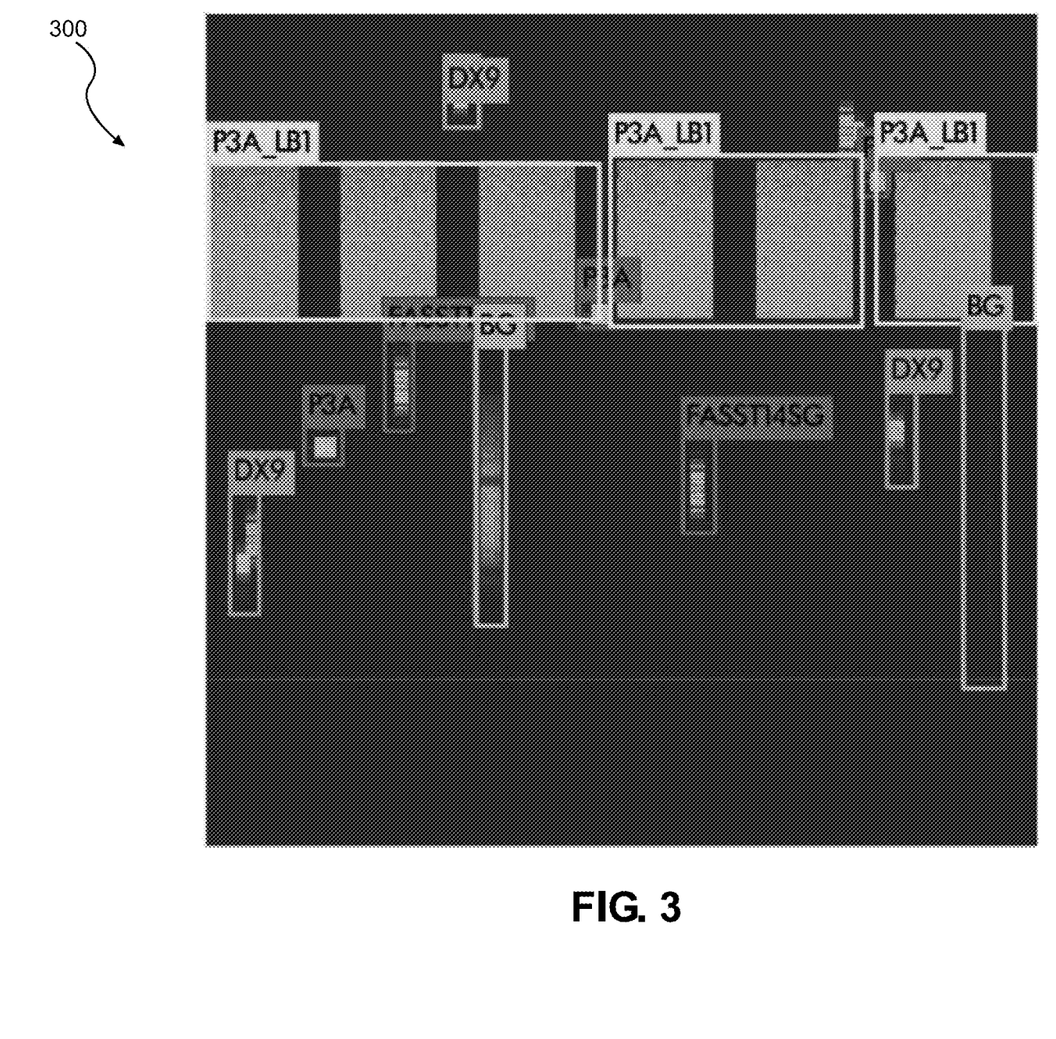
FIG. 3 shows an example illustration of a simultaneous detection and classification of heterogeneous transmitter frequency hops, Lightbridge bursts and background using a deep convolutional neural network (DCNN) according to aspects of the present disclosure.

FIG. 3 shows one example of a spectrogram illustration 300 of simultaneous detection and classification of heterogeneous transmitter frequency hops, Lightbridge bursts and background using a YOLOv2 Object Detection DCNN with the system of FIG. 1. In this example, the YOLOv2 Object Detection DCNN may be trained on 2048×2048 pixel sub spectrograms generated from 4096 point FFTs performed over 4096 sequential non-overlapping frames from the beginning of a one second file and their annotations (label files). The label files including bounding box coordinates for the RF objects in a spectrogram may be generated in KITTI (Karlsruhe Institute of Technology and Toyota Technological Institute) format and converted to the YOLO format using the open source Alps labeling tool (ALT). In this example, 120 spectrograms for each of P3A, FASST14SG and DX9 transmitters were used including a background class annotated with 70% used for training and 30% for testing. A composite I/Q file was constructed by adding together unseen I/Q files of the three RC transmitters and used for testing the trained Object Detection DCNN. FIG. 3 shows the detection and classification output of the DCNN.

It may be seen in FIG. 3 that all RF objects have been detected and classified (as indicated by the boxes and designations of the type of sUAS transmitter such as Spektrum DX9, Futaba FAAST14SG, etc.) which shows that simultaneous detection of heterogeneous transmitters has been achieved.

Figure 4:
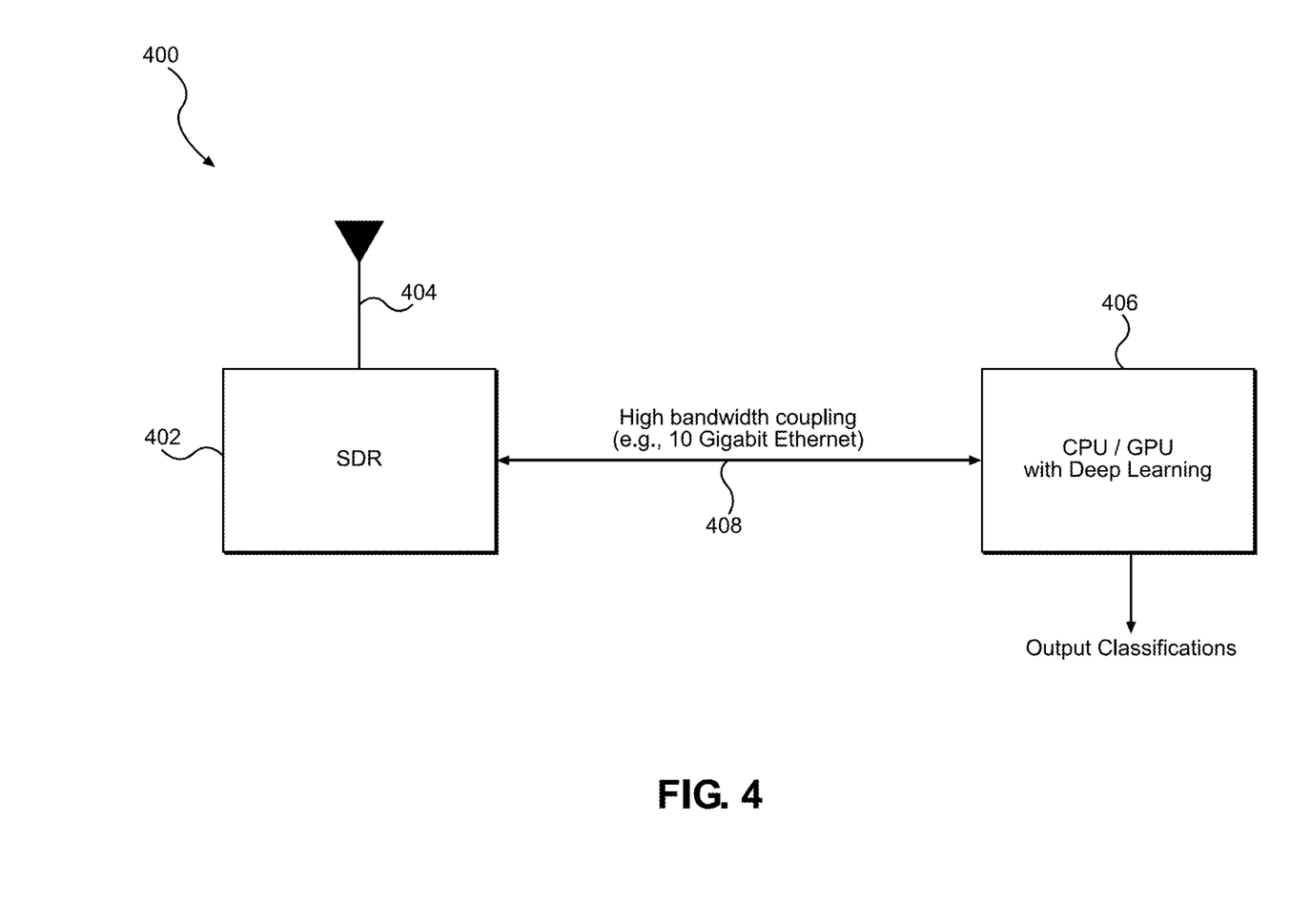
FIG. 4 shows a block diagram of an exemplary apparatus that may be utilized for RF detection and classification according to aspects of the present disclosure.

FIG. 4 shows a block diagram 400 of an exemplary RF detection/classification system that may implement the system described in connection with FIG. 2, for example. As illustrated the system 400 includes a software defined radio (SDR) 402, which may be instantiated with a USRP X300/UBX-160 SDR as merely one example. The SDR 402 is further coupled with an antenna 404, which may be implemented with a MARS MA-WO-UWB 138 MHz-6 GHz ultra wideband omnidirectional antenna followed by Mini Circuits Low Noise Amplifiers for the 433 MHz, 915 MHz, 2.4 GHz and 5.8 GHz industrial, scientific and medical (ISM) bands to detect RF signals in one example. The SDR 402 is also coupled with a processing unit 406 (CPU or GPU). In an embodiment, the unit 406 may be implemented with a NVIDIA GTX 1070 Graphics Processing Unit (GPU) or an NVIDIA Jetson TX2 (Maxwell GPU)/Jetson AGX Xavier (Volta GPU)/Jetson AGX Orin (Ampere GPU) embedded GPU platform. The SDR 402 and processing unit 406 may be coupled with a high bandwidth connection such as by a 10 Gigabit Ethernet. The processing unit 406 may be configured to implement one or more DCNN or common deep learning frameworks such as CAFFE, DIGITS, YOLO, PyTorch and TensorFlow.

In further aspects, it is noted that an object detection DCNN may also be applied to an EO simulation input in the form of RC flight simulator video frames from a source such as a flight simulator (e.g., RealFlight 7.5 simulator). Here, different types of aircraft may be "flown" in this experiment while capturing video of the flight simulator screen to a MPEG-4 file. In further aspects, a time period, such as 90 seconds of 30 fps video, may be recorded for each aircraft with a number of frames per video extracted (e.g., 2,700 frames). The method also includes labeling by drawing a bounding box around the aircraft in each frame and labeling automatically by running the frames through an ImageNet pre-trained YOLOv2 model, as an example, which had aircraft as one of its categories followed by overwriting the "aircraft" label with the actual type of aircraft being flown by modifying the YOLOv2 C code. The YOLOv2 object Detection DCNN may be trained on the frames and annotations of all selected training aircraft. In further implementations of object detection, pixel coordinates of a detected aircraft and the confidence level are continuously displayed as the aircraft is tracked frame-by-frame, and this procedure is applied to detect and classify sUAS in the present systems and methods. There are a number of quadcopter models that may be input into flight simulators or are resident in flight simulators. Video captured from such flight simulators can be used to initially train an EO Object Detection DCNN. Real-time video of quadcopters in flight may then be further used for training the DCNN. The tracking of bounding box pixel coordinates may be used to control the rotation of a video camera (Slew to Cue) mounted on a servo motor driven platform so that an aircraft is always in view at the center of the video frame. Object Detection DCNN may also be trained on the MS-COCO database to detect aircraft in the DIGITS/CAFFE DL framework. This alternative (backup) method can be used in inference mode on an NVIDIA Jetson TX2 embedded GPU platform (e.g., 406 as shown in FIG. 4 for field deployment). Furthermore, TensorRT can be used on the Jetson TX2, for example, for real-time inferencing.

Figure 5:
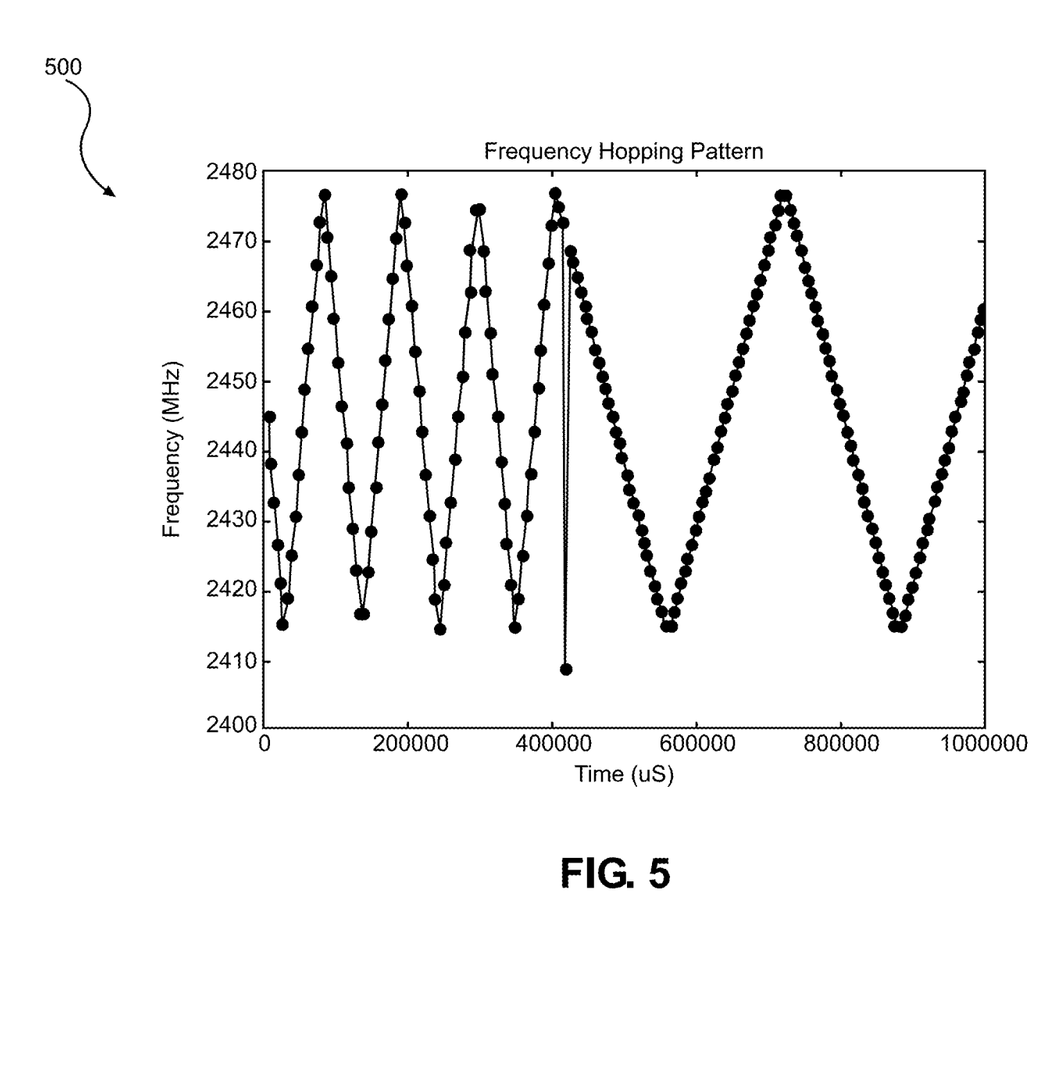
FIG. 5 illustrates an example of a frequency hop sequence implemented by a radio control (RC) handheld controller for a particular sUAS.

FIG. 5 shows an exemplary frequency hop sequence for an RC controller. In this example, the particular frequency hop sequence was extracted from a DJI Mavic Pro RC handheld controller for a one second sample, but those skilled in the art will appreciate that this is merely an example and the system will be applied to numerous and various controllers and their respective hop sequences. In a further development of the system and method, RF object detection on the output of a real-time spectrum analyzer (RTSA) may be utilized. In one example, a GNU Radio gr-fosphor utility can be used to display the RTSA waterfall (running spectrogram) on an X Window that is, in turn, output to a UDP port by FFmpeg (or any similar or equivalent multimedia conversion utility). In yet further examples, YOLOv2 software may be employed to read streamed video frames from a User Datagram Protocol (UDP) port and perform real-time RF object detection and classification. A gr-fosphor block may also connect to a UHD (USRP Hardware Driver) USRP block in GNU Radio companion for live acquisition of RF samples from the SDR (e.g., an X300/UBX-160 SDR).

For detection and classification of frequency hops, DJI Mavic Pro uplink and background noise can be visualized. It is also noted that YOLOv2 software (and updated versions up to YOLOv7) is open source C code that uses the OpenCV and NVIDIA CUDA (Compute Unified Device Architecture) GPU libraries. Gr-fosphor uses the OpenCL library for parallel FFT computing and OpenGL for rendering the graphics, with both libraries running on the GPU (e.g., 406). The training set can be expanded to include all the different types of RC transmitters for sUASs referred to above. In addition, a method for extracting the frequency hopping sequences from FHSS RC transmitters may use the RF labeled output of the YOLOv2 software. A python script processes the sequential labeled sub spectrogram frames (24 per 1 second I/Q recording) and output time-sorted hop sequences for a long short-term memory (LSTM) Recurrent Neural Network (RNN) may be used for training for frequency hop prediction.

Figure 6:
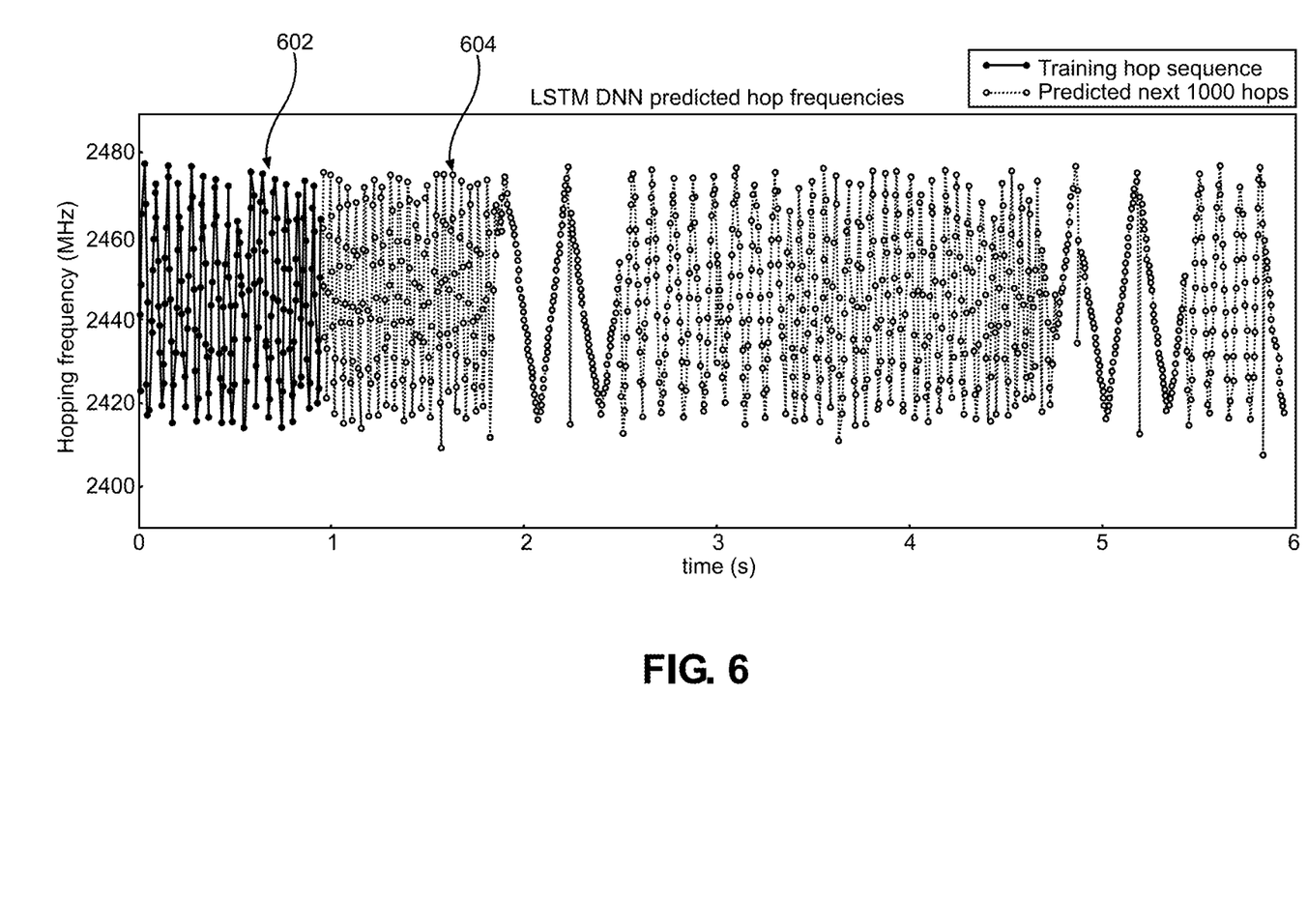
FIG. 6 shows an example of a frequency hop sequence input to trained long short-term memory (LSTM) Recurrent Neural Network and predicted output that may be implemented by the disclosed methods and apparatus according to aspects of the present disclosure.

FIG. 6 shows an example of a frequency hop sequence input to train an LSTM with a 1 second hop sequence (shown with first type of dashed/solid line 602) and a subsequent predicted hop sequence for the next 5 seconds (shown with second type of dashed/solid line 604) when no external input is applied and the LSTM RNN evolves in time with its output fed back to its input. When hopping sequences of a new type of RC transmitter are needed, this approach illustrated graphically in FIG. 6 can analyze the DCNN output and provide the prediction immediately after training.

Figure 7:
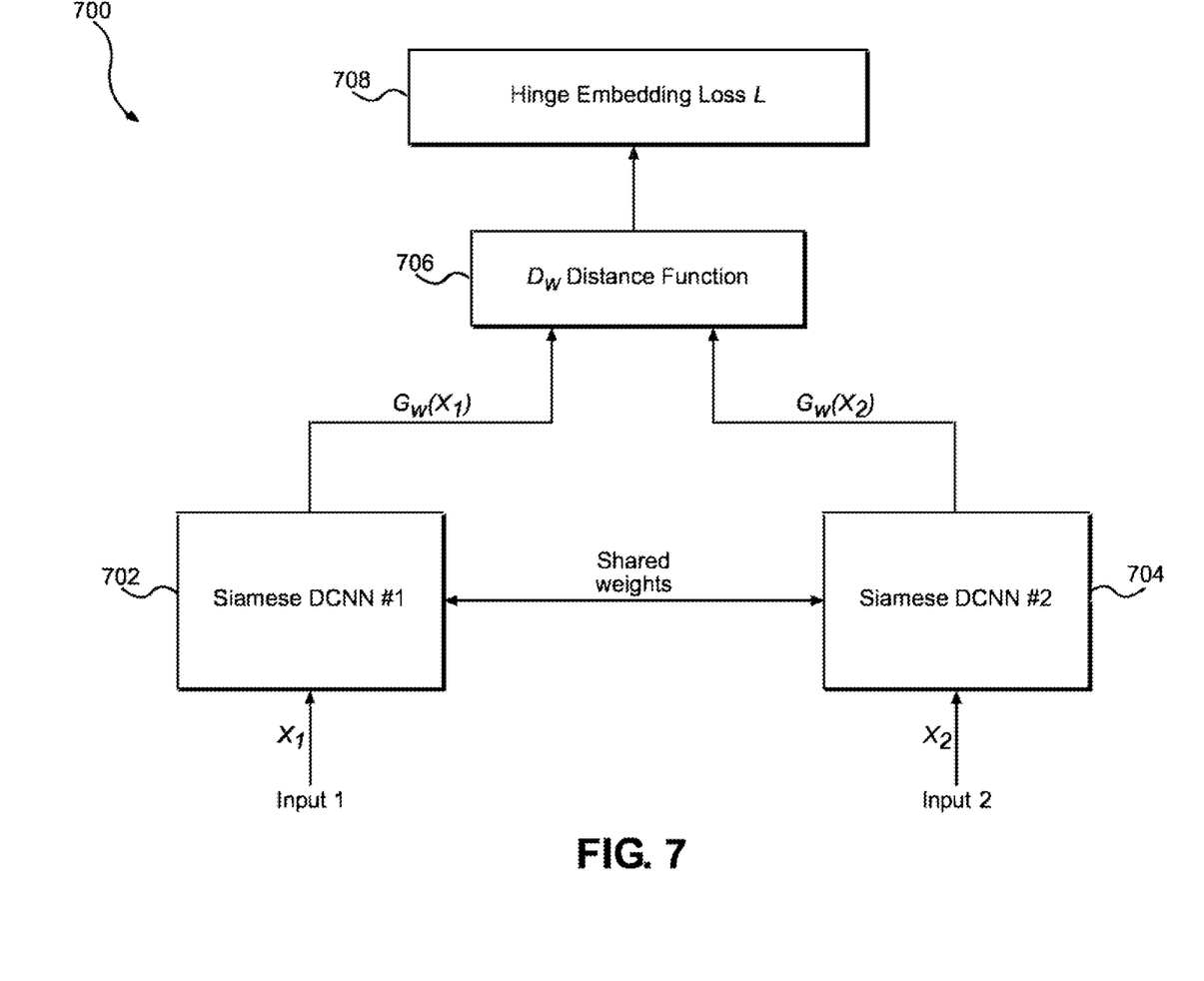
FIG. 7 shows a block diagram of an exemplary Siamese DCNN (SDCNN) that may be implemented with the disclosed apparatus according to aspects of the present disclosure.

In yet further aspects, another part of the system and method focuses on specific emitter identification or RF finger printing. In order to accomplish this finger printing, a Siamese DCNN (SDCNN) may be used for this task to train on the nonlinearities (due to power amplifiers, manufacturing defects etc.) of radio transmitters according to some aspects as is illustrated in FIG. 7. In particular, a Siamese DCNN is two identical DCNNs (which share the same weights) through which a pair of input feature vectors from the same or different transmitters are applied. In a still more particular embodiment, a one dimensional 1D Siamese DCNN with 4 convolutional layers may be utilized.

As shown in FIG. 7, the SDCNN illustrated 700 includes a first DCNN 702 receiving a first input 1 and a second DCNN 704 receiving a second input 2. The SDCNN structure illustrated shows that DCNNs 702 and 704 share the same weights. The processed data (first and second weighted outputs or vectors $G_w(X_1)$ and $G_W(X_2)$) is weighted and flows from the DCNNs 702 and 704 to a distance function or module 706, which computes the Euclidean distance between the feature embeddings (vectors $G_w(X_1)$ and $G_W(X_2)$), i.e. forward propagated inputs at the final layer. FIG. 7 further shows the flow of data from the distance function 706 to the computation of a Hinge Embedding Loss (HEL) function or computation module 708, which is at the output of the DCNN. The HEL 708 measures the degree of similarity of the pair of input vectors from the Euclidean distance between the feature embeddings, i.e. forward propagated inputs at the final layer.

Following the forward propagation, the gradient of the loss with respect to the DCNN parameters is computed and propagated backwards using a back propagation algorithm to update the DCNN parameters in such a way as to make the HEL small for inputs from the same transmitter and large for inputs from different transmitters. That is, the hinge embedding loss module 708 is configured to measure the degree of similarity of the first and second inputs from the Euclidean distance and determine a gradient of the loss with respect to DCNN parameters of the SDCNN and ensure that loss is small for same transmitters and large for different transmitters.

Figure 8:
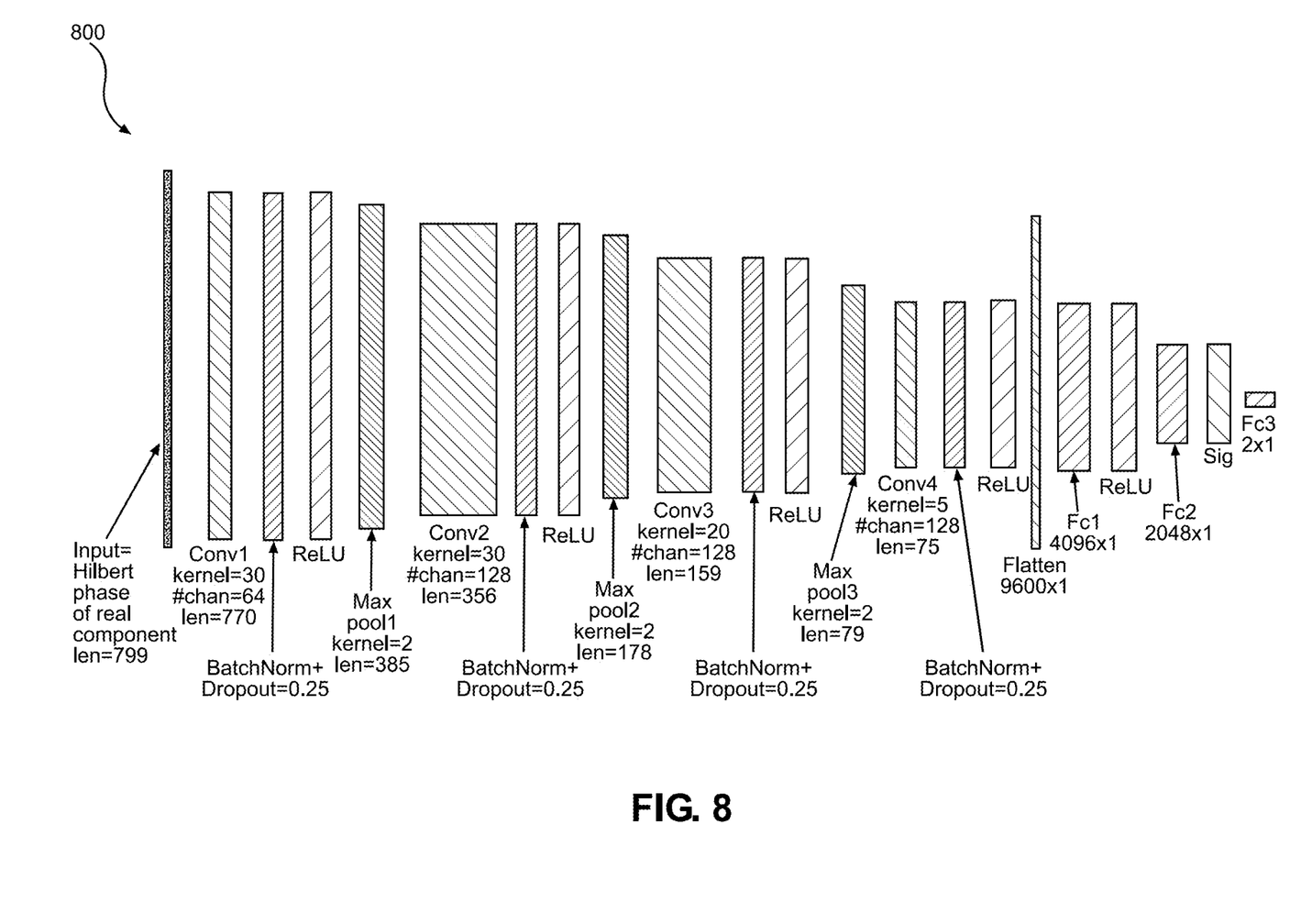
FIG. 8 shows an example diagram of processing of data by one branch of a one dimensional (1D) SDCNN of FIG. 7 according to aspects of the present disclosure.

FIG. 8 shows an example 800 of one branch of the SDCNN illustrated in FIG. 7. In this particular exemplary case, an SDCNN is trained on feature vectors from preambles in ADSB (Automatic Dependent Surveillance-Broadcast) message waveforms as a surrogate for sUAS RC transmitter waveforms since the latter would require hundreds of RC transmitters of the same model. ADSB messages are transmitted by aircraft at 1090 MHz to inform ground based receivers of their location. The ADSB transmission is sampled at 8 Mbps by a USRP software defined radio (SDR). The feature vector is the first difference of the phase computed from the Hilbert transform of the real component of 64 samples spanning a preamble upsampled by 12.5. The ADSB dataset comprises 211 unique Signal IDs (ICAO aircraft transmitter addresses). The test set consists of waveforms from 14 Signal IDs that are a subset of training Signal IDs, but with different sets of waveforms. The total number of preambles in this example is 8,189 for the training set and 878 for the test set. After training, the SDCNN of the present disclosure has shown a similar/dissimilar classification decision accuracy of 95% on the training set and 75% on the test set. The code for the SDCNN was developed in PyTorch.

Figure 9:
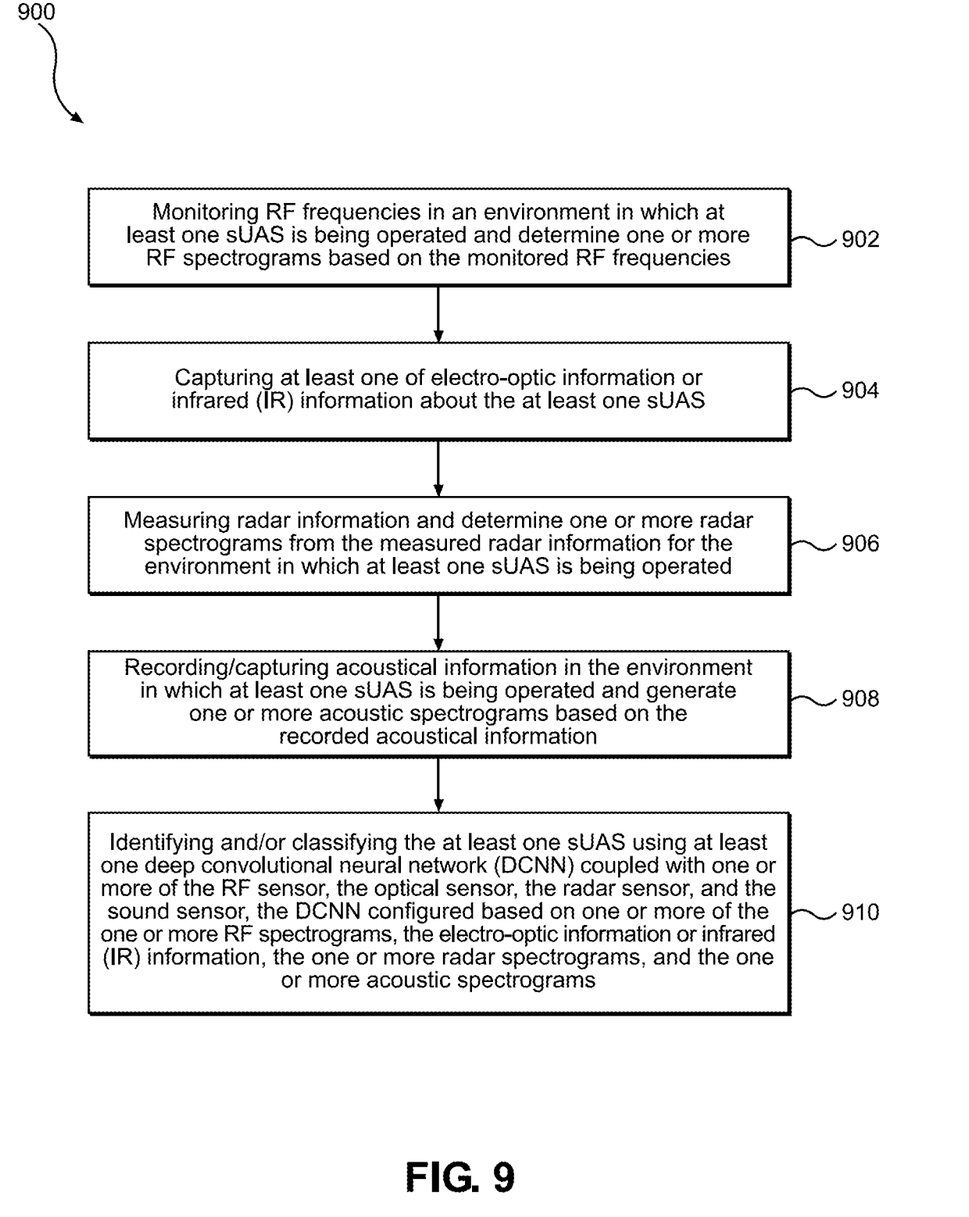
FIG. 9 illustrates a flow diagram of an exemplary method 900 for small unmanned aerial systems (sUAS) detection and classification.

FIG. 9 illustrates a flow diagram of an exemplary method 900 for small unmanned aerial systems (SUAS) detection and classification. Method 900 includes monitoring RF frequencies in an environment in which at least one sUAS is being operated and determine one or more RF spectrograms based on the monitored radio frequencies as shown at block 902. Further, method 900 includes capturing at least one of electro-optic information or infrared (IR) information about the at least one sUAS as shown at block 904.

Next, method 900 includes measuring radar information and determine one or more radar spectrograms from the measured radar information for the environment in which at least one sUAS is being operated as shown at block 906. In block 908, method 900 includes recording/capturing acoustical information in the environment in which at least one sUAS is being operated and generate one or more acoustic spectrograms based on the recorded acoustical information. Finally, method 900 includes identifying and/or classifying the at least one sUAS using at least one deep convolutional neural network (DCNN) coupled with one or more of the RF sensor, the optical sensor, the radar sensor, and the sound sensor, the DCNN configured based on one or more of the one or more RF spectrograms, the electro-optic information or infrared (IR) information, the one or more radar spectrograms, and the one or more acoustic spectrograms as shown in block 910.

Although the invention has been described in detail with reference to certain preferred embodiments, variations and modifications exist within the spirit and scope of the invention as described and defined in the following claims.

The invention claimed is:

1. A small unmanned aerial systems (SUAS) detection and classification system comprising:
  a radio frequency (RF) sensor configured to monitor radio frequencies in an environment in which at least one sUAS is being operated and determine one or more RF spectrograms based on the monitored radio frequencies;
  an optical sensor configured to capture at least one of electro-optic information or infrared (IR) information about the at least one SUAS;
  a radar sensor configured to measure radar information and determine one or more radar spectrograms from the measured radar information for the environment in which the at least one sUAS is being operated;
  a sound sensor configured to record acoustical information in the environment in which the at least one SUAS is being operated and generate one or more acoustic spectrograms based on the recorded acoustical information; and
  a plurality of deep convolutional neural networks (DCNNs) wherein each of the plurality of DCNNs is respectively coupled with the RF sensor, the optical sensor, the radar sensor, and the sound sensor, the DCNNs configured to perform deep learning to identify and/or classify the at least one SUAS based on one or more of the one or more RF spectrograms, the electro-optic information or infrared (IR) information, the one or more radar spectrograms, and the one or more acoustic spectrograms;
  wherein at least one DCNN of the plurality of DCNNs is further configured to receive trained weights input from a training processor for determining identification and/or classification of the at least one SUAS; and
  wherein the at least one DCNN of the plurality of DCNNs comprises a Siamese DCNN (SDCNN) configured to train on nonlinearities of a plurality of radio transmitters.

2. The SUAS detection and classification system of claim 1, wherein the system is configured to:
  collect at least one frequency hop sequence of an RF signal corresponding to the at least one SUAS.

3. The SUAS detection and classification system of claim 2, wherein the system is configured to:
  train at least one long short-term memory (LSTM) recurrent neural network (RNN) based on the collected at least one frequency hop sequence; and
  predict subsequent transmission of next hop frequencies of the at least one frequency hop sequence corresponding to the at least one SUAS using the LSTM RNN trained based on the collected at least one frequency hop sequence.

4. The SUAS detection and classification system of claim 1, further comprising:
  an ultra wideband (UWB) omnidirectional antenna coupled to the RF sensor.

5. The SUAS detection and classification system of claim 1, wherein the SDCNN comprises:
a first Siamese DCNN configured to receive a first input and output a first weighted data;
a second Siamese DCNN configured to receive a second input and output a second weighted data, wherein the first and second Siamese DCNNs are configured to share the input trained weights;
a distance module configured to compute a Euclidean distance between the output first and second weighted data; and
a hinge embedding loss (HEL) computation module configured to measure the degree of similarity of the first and second inputs from the Euclidean distance and determine a gradient of the loss with respect to DCNN parameters of the SDCNN.

6. The SUAS detection and classification system of claim 5, wherein the SDCNN is further configured to propagate the gradient of the loss backwards using a back propagation algorithm to update the DCNN parameters of the SDCNN such that the HEL is a first value when the first and second inputs originate from a same RF transmitter for a particular SUAS and a second value when the first and second inputs respectively originate from different RF transmitters for two respective particular sUASs, wherein the first value is less than the second value.

7. A method for small unmanned aerial systems (SUAS) detection and classification comprising:
monitoring radio frequencies using a radio frequency (RF) sensor in an environment in which at least one SUAS is being operated and determine one or more RF spectrograms based on the monitored radio frequencies;
capturing at least one of electro-optic information or infrared (IR) information about the at least one SUAS;
measuring radar information and determine one or more radar spectrograms from the measured radar information for the environment in which the at least one SUAS is being operated;
recording acoustical information in the environment in which the at least one SUAS is being operated and generate one or more acoustic spectrograms based on the recorded acoustical information; and
identifying and/or classifying the at least one sUAS using a plurality of deep convolutional neural networks (DCNNs) wherein each of the plurality of DCNNs is respectively coupled with the RF sensor, the optical sensor, the radar sensor, and the sound sensor, the DCNNs configured to perform deep learning for identifying and/or classifying the at least one SUAS based on one or more of the one or more RF spectrograms, the electro-optic information or infrared (IR) information, the one or more radar spectrograms, and the one or more acoustic spectrograms;
wherein at least one DCNN of the plurality of DCNNs is further configured to receive trained weights input from a training processor for determining identification and/or classification of the at least one SUAS; and
wherein the at least one DCNN of the plurality of DCNNs comprises a Siamese DCNN (SDCNN) configured to train on nonlinearities of a plurality of radio transmitters.

8. The method for sUAS detection and classification of claim 7, further comprising:
collecting at least one frequency hop sequence of an RF signal corresponding to the at least one SUAS.

9. The method for SUAS detection and classification of claim 8, further comprising:
training at least one long short-term memory (LSTM) recurrent neural network (RNN) based on the collected at least one frequency hop sequence; and
predicting subsequent transmission of next hop frequencies of the at least one frequency hop sequence corresponding to the at least one SUAS using the LSTM RNN trained based on the collected at least one frequency hop sequence.

10. The method for SUAS detection and classification of claim 7, wherein the SDCNN comprises:
a hinge embedding loss (HEL) computation module configured to measure the degree of similarity of the first and second inputs from the Euclidean distance and determine a gradient of the loss with respect to DCNN parameters of the SDCNN,
a first Siamese DCNN configured to receive a first input and output a first weighted data;
a second Siamese DCNN configured to receive a second input and output a second weighted data, wherein the first and second Siamese DCNNs are configured to share the input trained weights;
a distance module configured to compute a Euclidean distance between the output first and second weighted data; and
a hinge embedding loss (HEL) computation module configured to measure the degree of similarity of the first and second inputs from the Euclidean distance and determine a gradient of the loss with respect to DCNN parameters of the SDCNN.

11. The method for SUAS detection and classification of claim 10, wherein the SDCNN is further configured to propagate the gradient of the loss backwards using a back propagation algorithm to update the DCNN parameters of the SDCNN such that the HEL is a first value when the first and second inputs originate from a same RF transmitter for a particular sUAS and a second value when the first and second inputs respectively originate from different RF transmitters for two respective particular sUASs, wherein the first value is less than the second value.

* * * * *